(12) United States Patent
Olds et al.

(10) Patent No.: US 10,602,378 B1
(45) Date of Patent: *Mar. 24, 2020

(54) SATELLITES AND SATELLITE-BASED SYSTEMS FOR GROUND-TO-SPACE SHORT-BURST DATA COMMUNICATIONS

(71) Applicant: SpaceWorks Enterprises, Inc., Atlanta, GA (US)

(72) Inventors: John Olds, Dunwoody, GA (US); Kevin Feld, Dunwoody, GA (US); Mark Schaffer, Atlanta, GA (US); Alexander Cheu, Atlanta, GA (US)

(73) Assignee: SpaceWorks Enterprises, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,714

(22) Filed: Jun. 18, 2019

Related U.S. Application Data

(63) Continuation of application No. 15/658,877, filed on Jul. 25, 2017, now Pat. No. 10,368,251.
(Continued)

(51) Int. Cl.
*H04W 16/28* (2009.01)
*B64G 1/10* (2006.01)
(Continued)

(52) U.S. Cl.
CPC .......... *H04W 16/28* (2013.01); *B64G 1/1007* (2013.01); *B64G 1/222* (2013.01); *B64G 1/443* (2013.01); *H04W 84/06* (2013.01)

(58) Field of Classification Search
CPC ...... B64G 1/10; B64G 1/1021; B64G 1/1007; H01Q 1/288; H01Q 3/2652; H01Q 3/22; H01Q 3/24; H01Q 3/26; H01Q 3/2605; H01Q 3/2676; H01Q 3/2682; H01Q 3/2694; H01Q 3/30; H01Q 3/34; H01Q 3/36; H01Q 3/38; H04B 10/118; H04B 7/18513; H04B 7/18515; H04B 7/0617; H04B 7/185;
(Continued)

(56) References Cited

U.S. PATENT DOCUMENTS 5,653,407 A * 8/1997 Bertheux ............... B64G 1/222
244/168
10,181,896 B1 * 1/2019 Swift ................ H04W 52/0216
(Continued)

*Primary Examiner* — Devan A Sandiford
(74) *Attorney, Agent, or Firm* — Morris, Manning & Martin, LLP; Daniel E. Sineway, Esq.; Adam J. Thompson, Esq.

(57) ABSTRACT

The disclosed system comprises one or more small satellites (e.g., CubeSats), one or more ground transmitters, and one or more downlink receivers to facilitate ground-to-space short-burst data communications. The CubeSats are miniaturized or small-form satellites that orbit the Earth transmitting data to and from the ground transmitters and the downlink receivers in low Earth orbit. To efficiently use its surface area, in various embodiments, the CubeSats are designed with deployable and folding wings such that the zenith-pointing side of the wings comprises solar panels and the nadir-pointing side of the wings comprises an antenna. In various embodiments, to increase the data transmission capacity of the CubeSats, the CubeSats comprise a deployable phased array antenna and a software defined radio.

16 Claims, 10 Drawing Sheets

EXEMPLARY SYSTEM OVERVIEW

Related U.S. Application Data

(60) Provisional application No. 62/366,270, filed on Jul. 25, 2016.

(51) Int. Cl.
*B64G 1/22* (2006.01)
*B64G 1/44* (2006.01)
*H04W 84/06* (2009.01)

(58) Field of Classification Search
CPC ............ H04B 7/18517; H04B 7/18519; H04B 7/18576; H04W 16/28
See application file for complete search history.

(56) References Cited

U.S. PATENT DOCUMENTS

| | | | |
|---|---|---|---|
| 2005/0211828 A1* | 9/2005 | Gloyer | B64G 1/007 244/51 |
| 2007/0221787 A1* | 9/2007 | McKinnon | B64G 1/222 244/171.8 |
| 2016/0114910 A1* | 4/2016 | Steele | B64G 1/443 244/172.7 |
| 2016/0137319 A1* | 5/2016 | Steele | B64G 1/443 52/745.2 |
| 2018/0175785 A1* | 6/2018 | Rakow | H02S 30/20 |
| 2019/0144138 A1* | 5/2019 | Spark | H02S 30/20 244/172.6 |

* cited by examiner

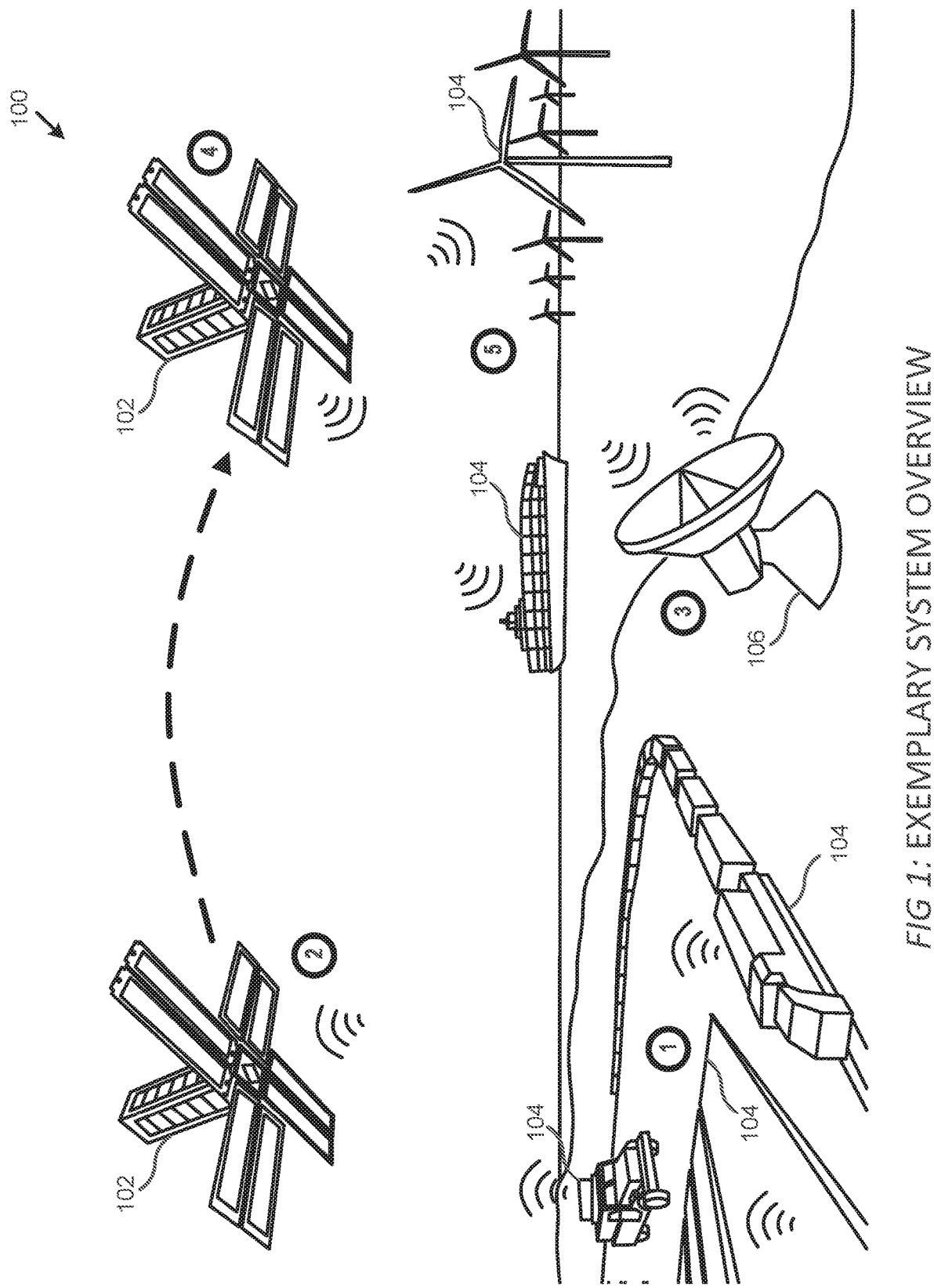
FIG 1: EXEMPLARY SYSTEM OVERVIEW

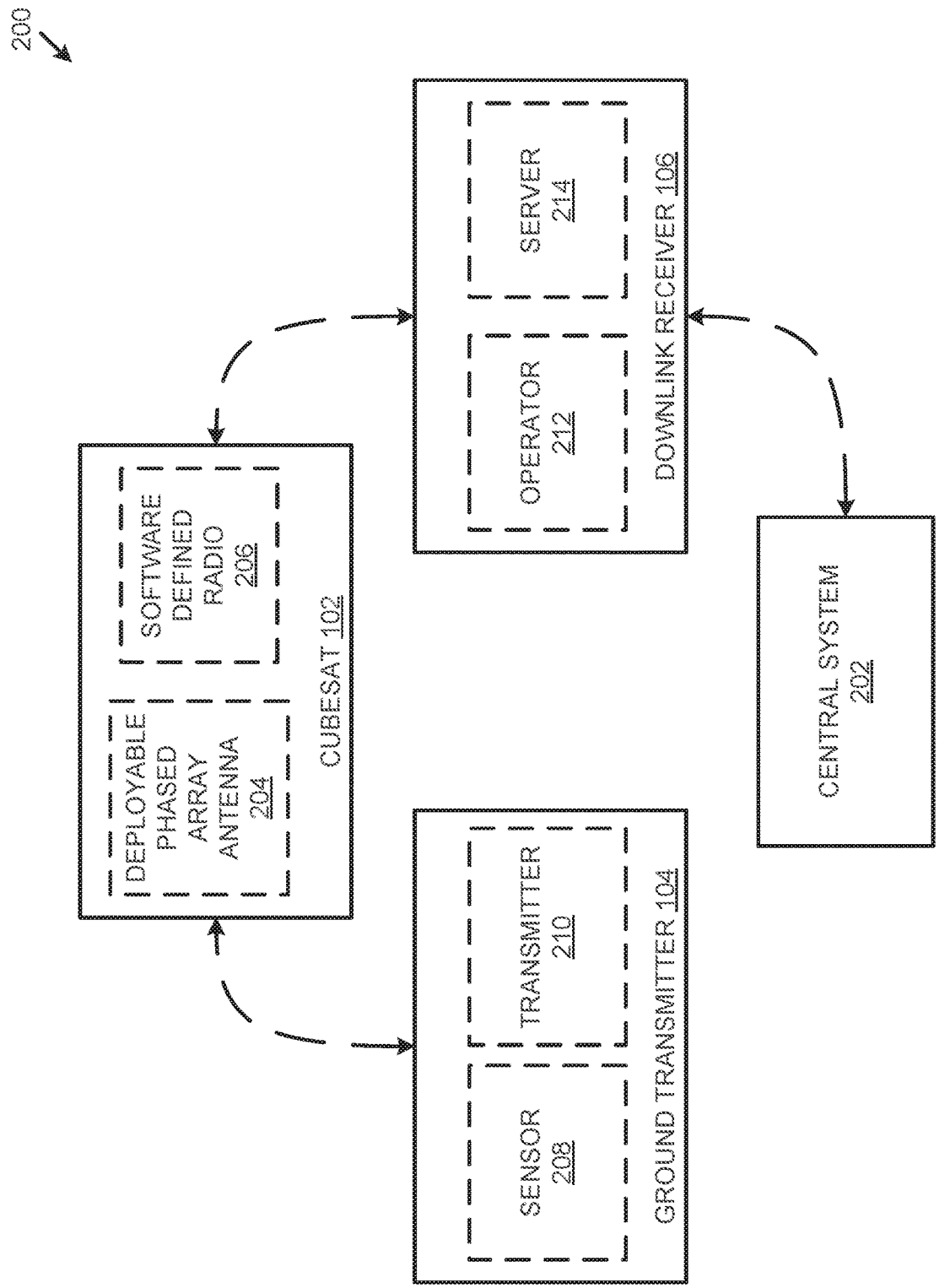
FIG 2. EXEMPLARY SYSTEM ARCHITECTURE

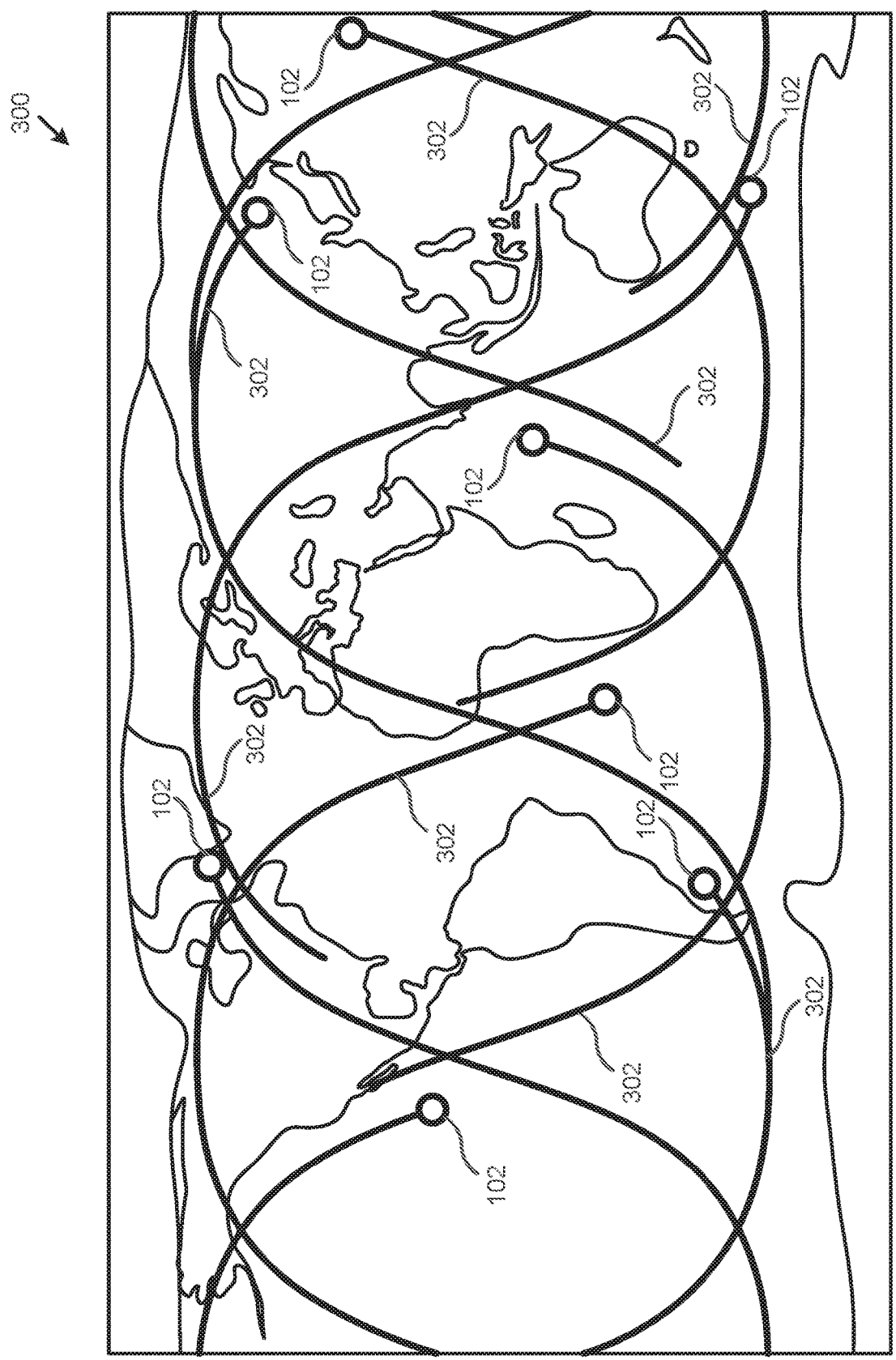
FIG 3: EXEMPLARY LOW EARTH ORBIT CONSTELLATION

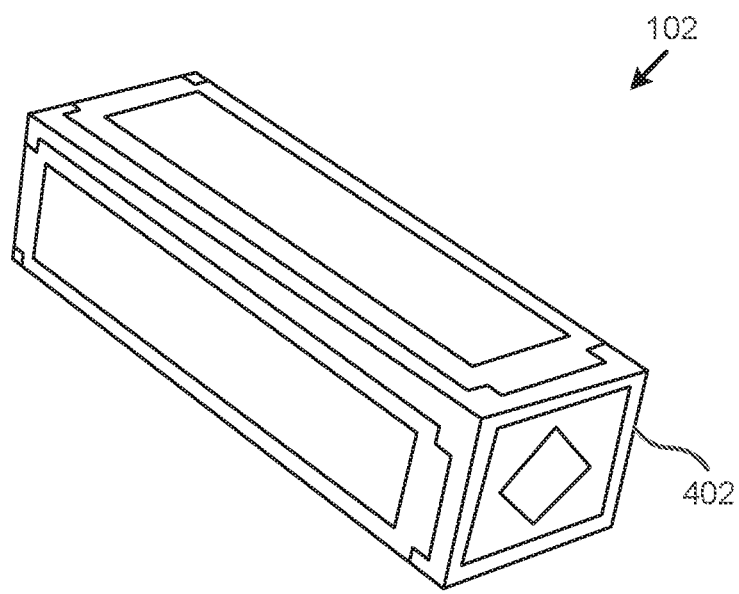
*FIG 4A:* EXEMPLARY CUBESAT
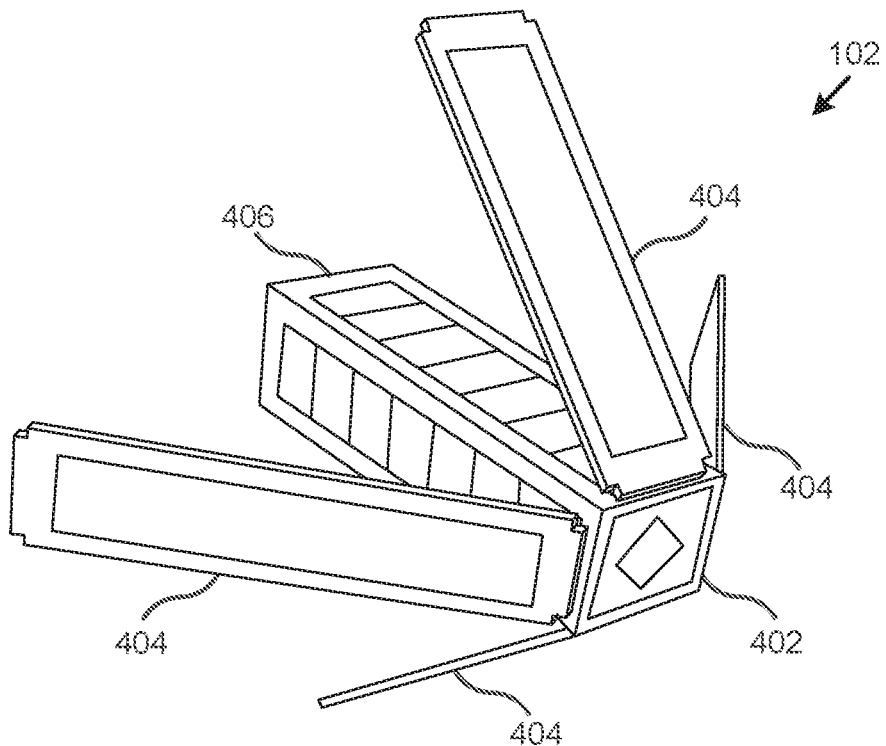
*FIG 4B:* EXEMPLARY CUBESAT

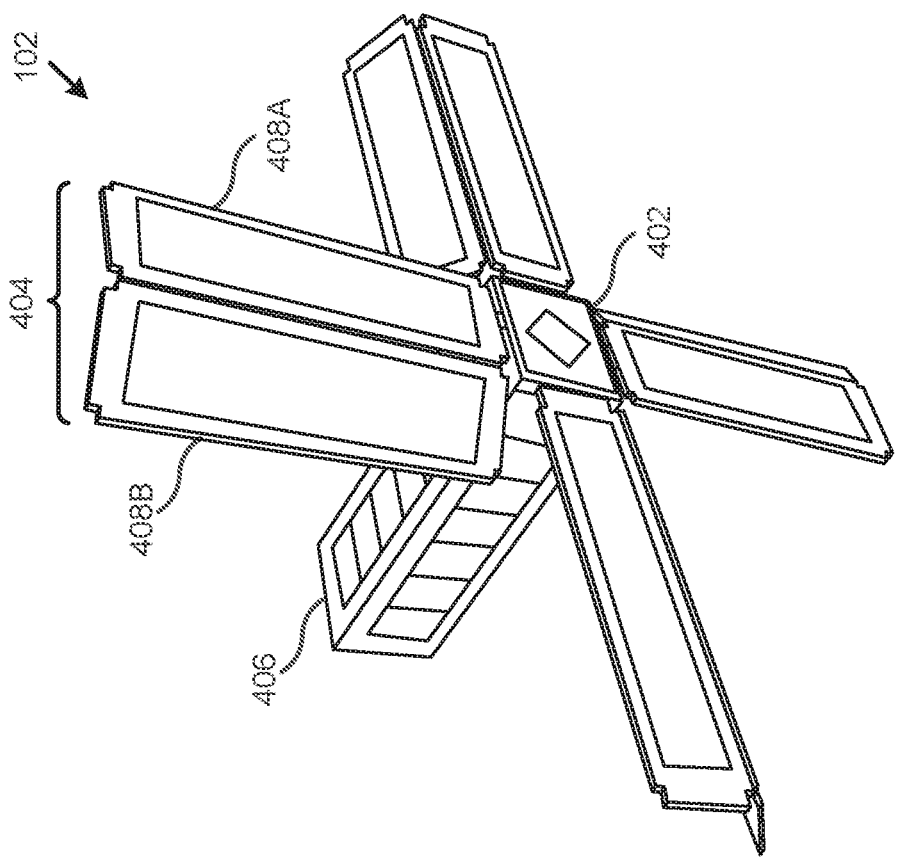
FIG 4D: EXEMPLARY CUBESAT
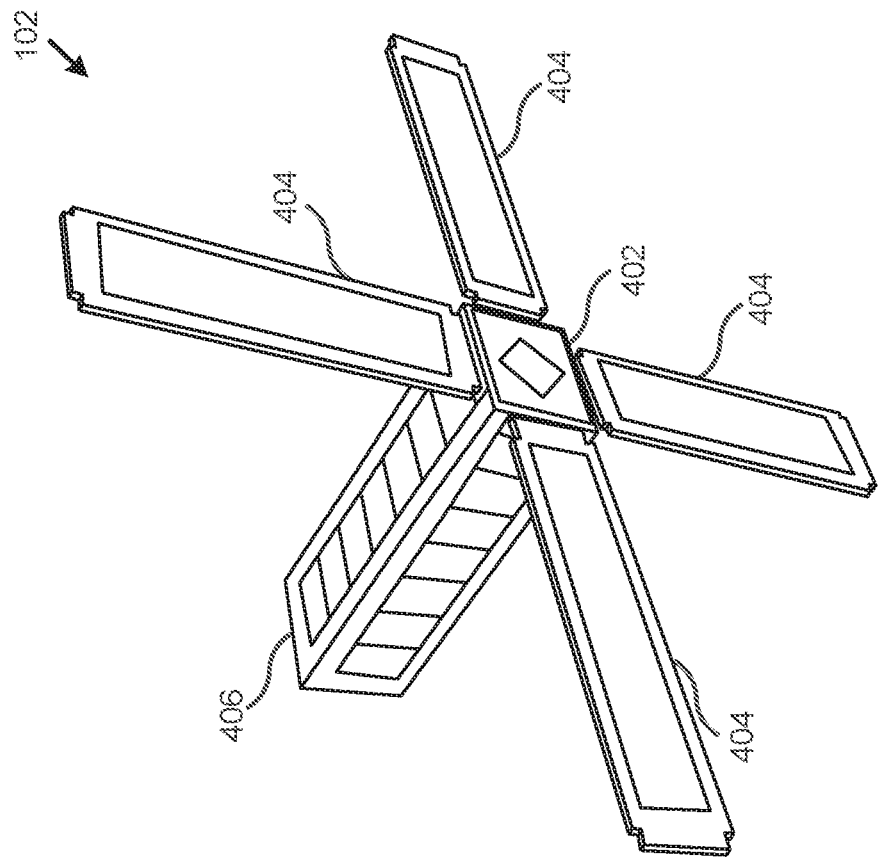
FIG 4C: EXEMPLARY CUBESAT

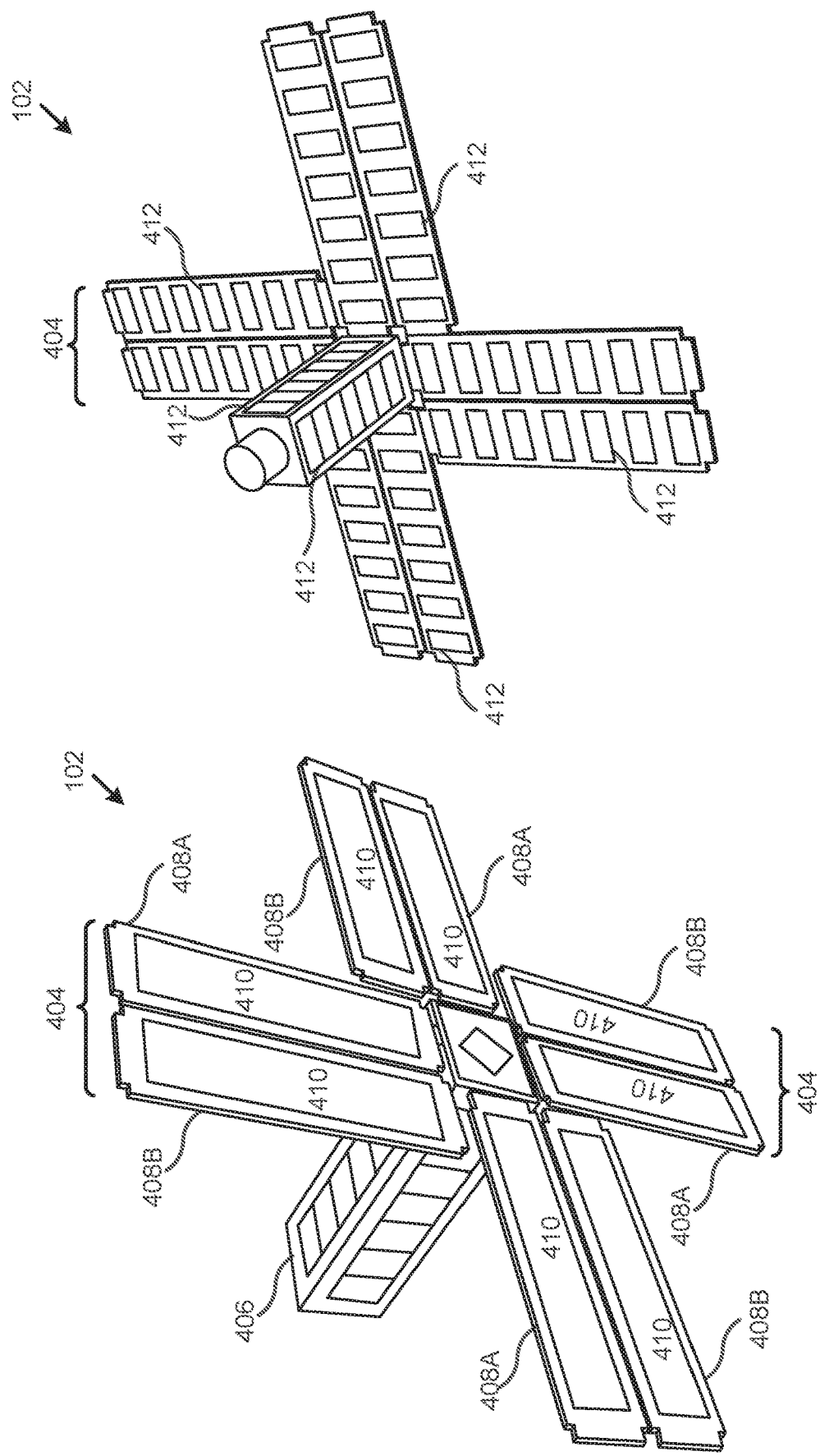
FIG 4F: EXEMPLARY CUBESAT
FIG 4E: EXEMPLARY CUBESAT

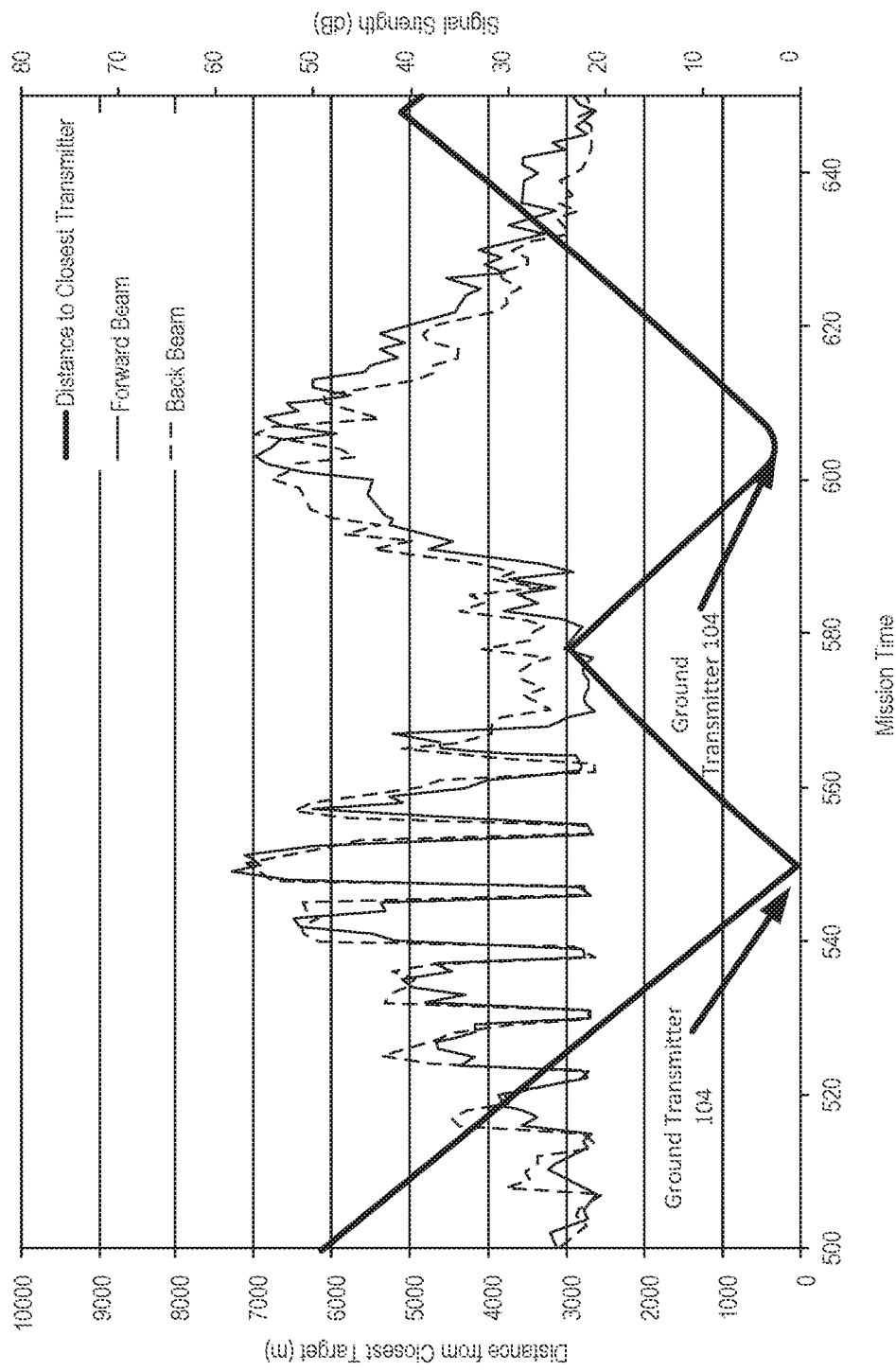
FIG 5A: EXEMPLARY TEST RESULTS

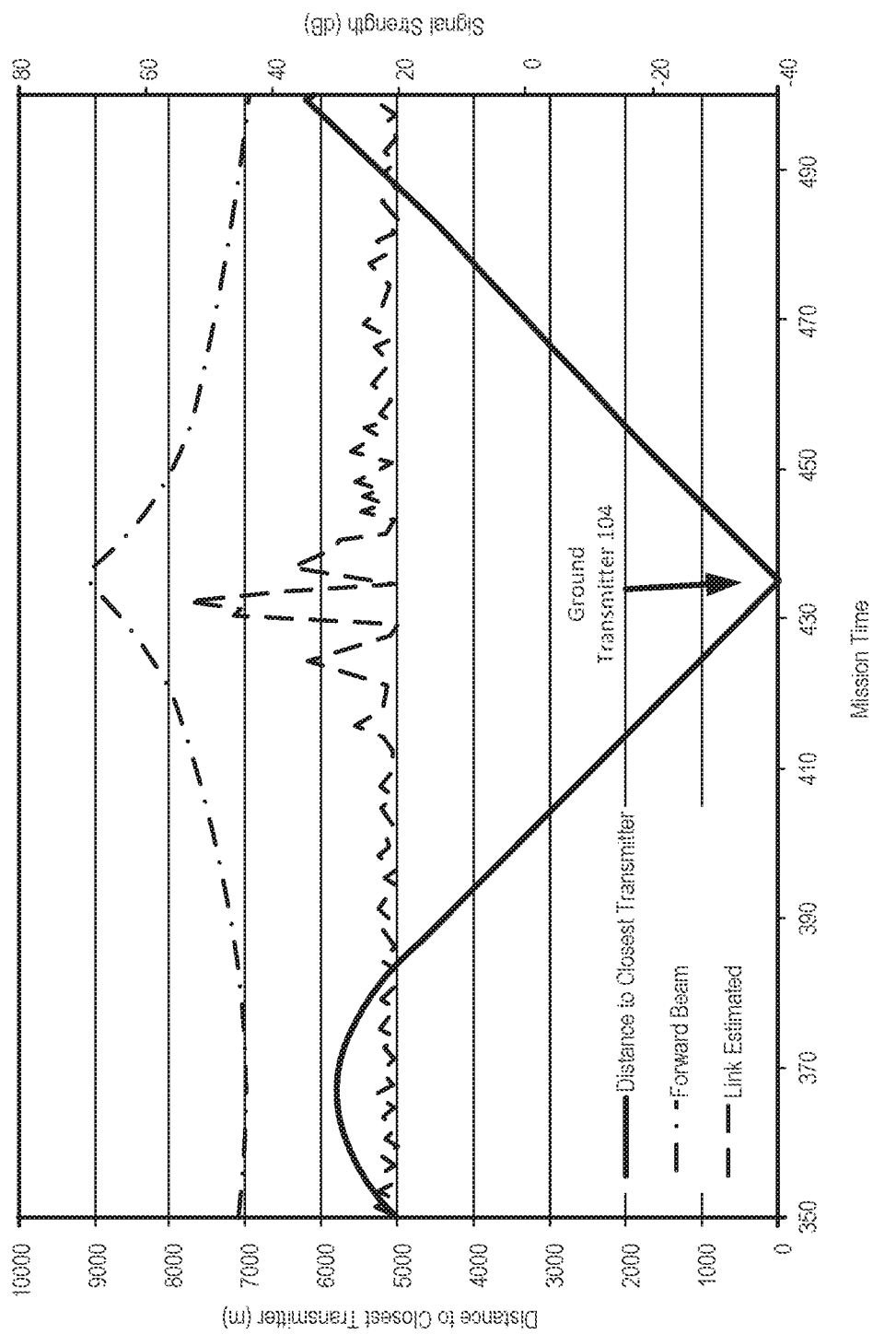
FIG 5B: EXEMPLARY TEST RESULTS

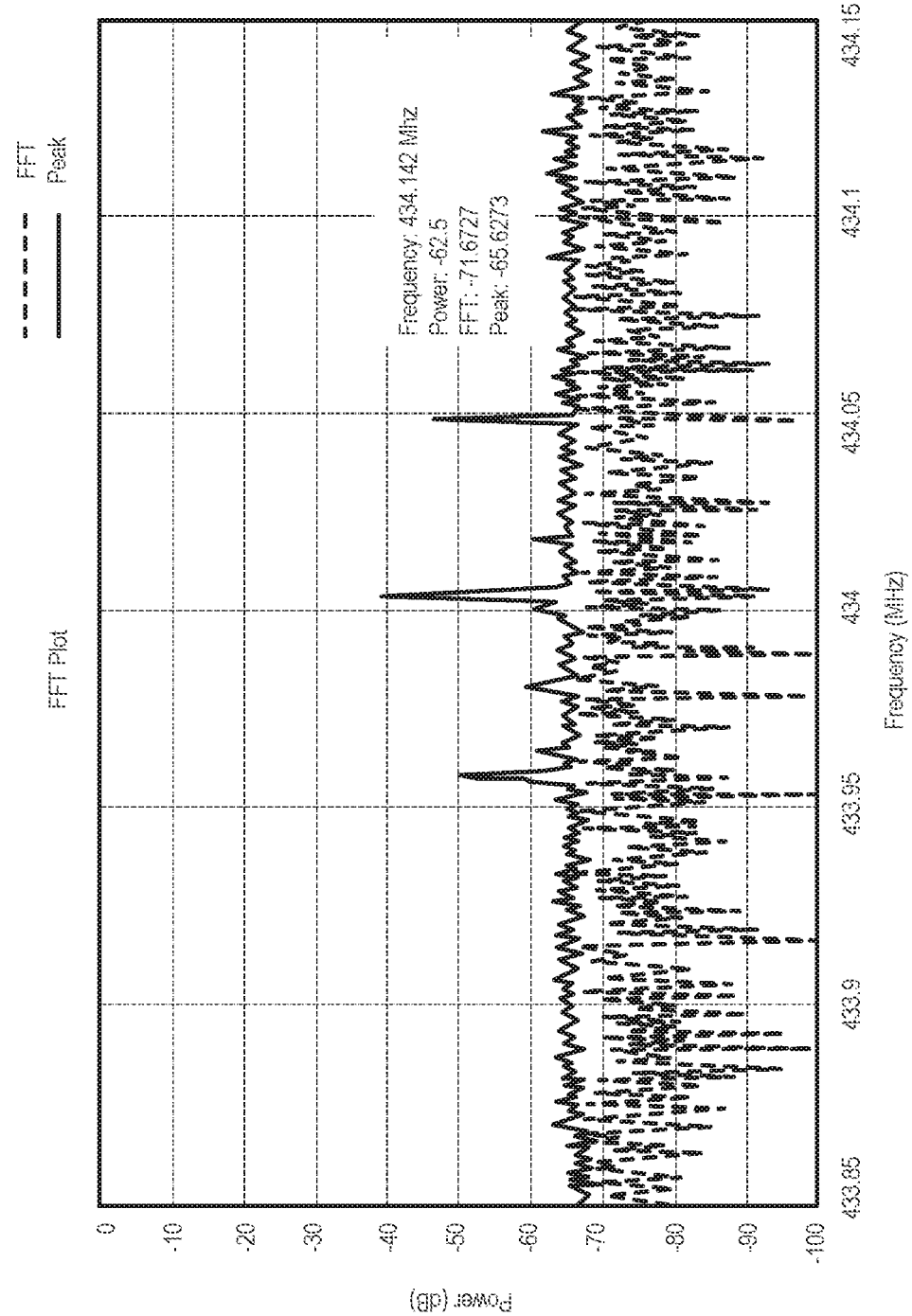
FIG 6A: EXEMPLARY TEST RESULTS

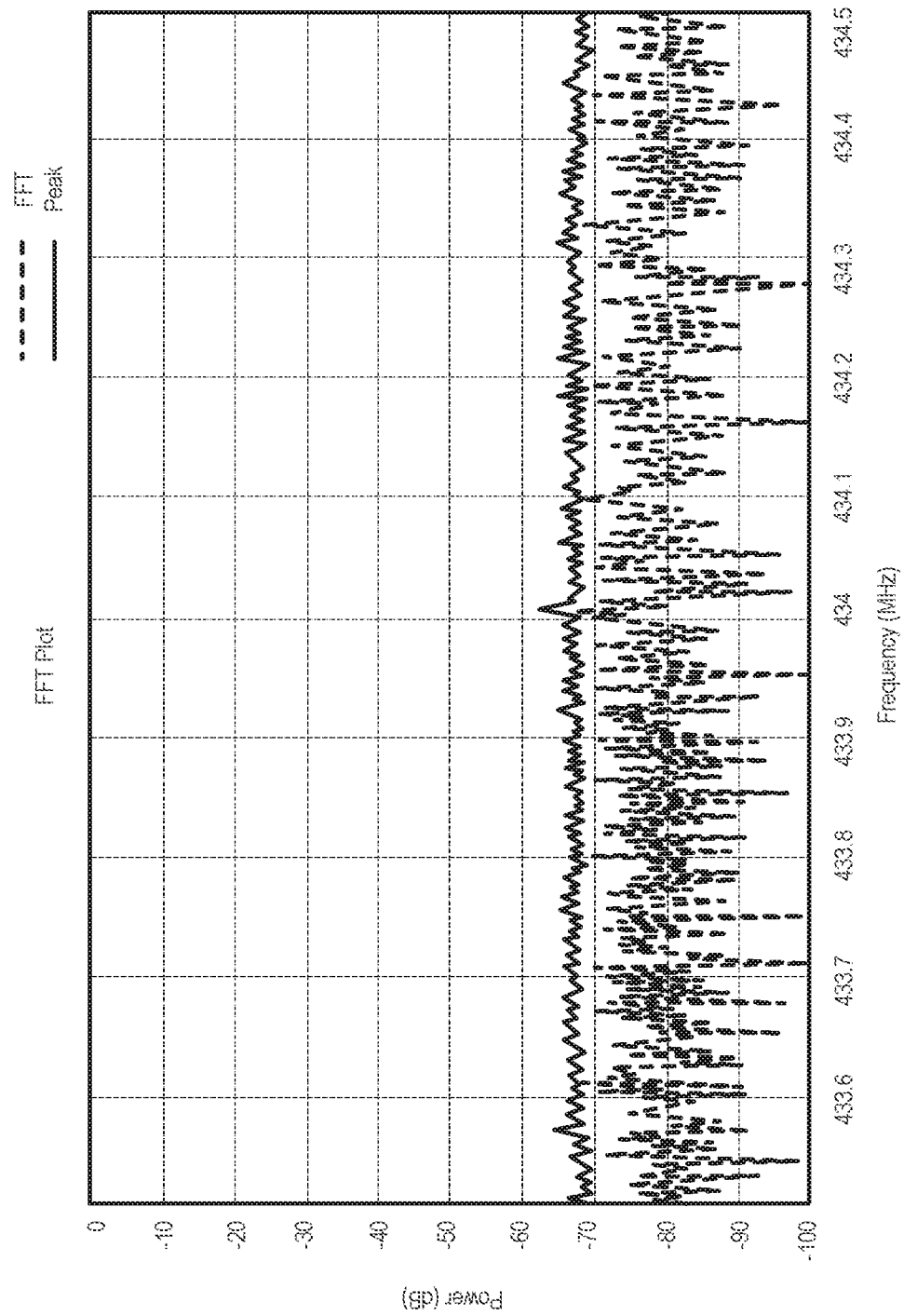
FIG 6B: EXEMPLARY TEST RESULTS

US 10,602,378 B1

SATELLITES AND SATELLITE-BASED SYSTEMS FOR GROUND-TO-SPACE SHORT-BURST DATA COMMUNICATIONS

CROSS REFERENCE TO RELATED APPLICATIONS

This application is a continuation application that claims priority to U.S. Non-Provisional patent application Ser. No. 15/658,877, filed Jul. 25, 2017, entitled "Satellites And Satellite-Based Systems For Ground-To-Space Short-Burst Data Communications", which in turn claims priority to U.S. Provisional Patent Application No. 62/366,270, filed Jul. 25, 2016, and entitled "A Satellite-Based System for Ground-to-Space Short-Burst Data Communications", the disclosures of which are herein incorporated by reference in their entireties.

TECHNICAL FIELD

The present systems relate generally to satellite-based communications and, more particularly, to small satellites and the use of small satellites, such as CubeSats and CubeSat-based systems, for ground-to-space short-burst data communications.

BACKGROUND

Current ground-to-space short-burst data communications generally require relatively large satellites orbiting Earth in communication with relatively large and high-powered ground transmitters on Earth via low-gain data links. These large satellite/large ground transmitter communication systems are currently not economically feasible in markets where terrestrial communications services, such as cellular systems, are available (e.g., machine-to-machine connectivity, Internet of Things, etc.). Generally, these terrestrial communications services are currently both faster and more cost effective as compared to the large satellite/large ground transmitter communication systems.

Thus, in recent years, smaller satellites have been developed to accomplish some needed functionality but at a smaller cost and form factor as compared to conventional satellites. CubeSats, for example, are miniaturized satellites (e.g., "U-class spacecraft" conforming to a standard developed by California Polytechnic State University and Stanford University) that comprise one or more cubic units customized to facilitate a particular task (e.g., research, communications, observation, etc.). In various embodiments, the cubic units have dimensions between 5 cm and 20 cm on a side. In one embodiment, the "1U" variant, the cubic units have dimensions of 10 cm, or approximately 10 cm, on a side (e.g., 10×10×10). In various embodiments, the cubic units weigh between 0.5-5 kg each. In one embodiment, in the "1U" variant, the cubic units weigh no more than 1.33 kg each. Given these size constraints, CubeSats are currently not deployed as part of ground-to-space short-burst data communications systems because CubeSats cannot currently house the equipment or provide the necessary power required to consistently facilitate ground-to-space short-burst data communications.

Therefore, there is a long-felt but unresolved need for systems that facilitate ground-to-space short-burst data communications but at lower costs as compared to large, traditional satellite systems.

BRIEF SUMMARY OF THE DISCLOSURE

Briefly described, and according to one embodiment, aspects of the present disclosure generally relate to small satellites and the use of small satellites, such as CubeSats and CubeSat-based systems, for ground-to-space short-burst data communications.

In various embodiments, the disclosed system comprises one or more small satellites (e.g., also referred to herein as "CubeSats" for ease of reference), one or more ground transmitters, and one or more downlink receivers to facilitate ground-to-space short-burst data communications. The disclosed system, in various embodiments, can be used in various Internet of Things applications or other areas in which traditional cell data or internet connections are not available. For example, the disclosed system permits the owner of multiple wind farms to monitor the status of the turbines enabled with ground transmitters in the farms without visiting the farms (e.g., determining efficiency to detect maintenance issues, sending commands to the turbines to protect them from damage, etc.). Similarly, the disclosed system permits remote monitoring of the conditions of fields on a farm (e.g., how much water a particular acre needs, received sunlight, etc.). Further, the disclosed system permits tracking shipments across oceans.

Generally, CubeSats are miniaturized or small-form satellites that orbit the Earth transmitting data to and from the ground transmitters and the downlink receivers in low Earth orbit. To efficiently use spacecraft surface area, in various embodiments, the CubeSats are designed with deployable and folding wings such that the zenith-pointing side of the wings comprises solar panels and the nadir-pointing side of the wings comprises an antenna. In various embodiments, to increase the data transmission capacity of the CubeSats, the CubeSats comprise a deployable phased array antenna and a software defined radio, which shifts traditional spacecraft pointing and data transmission functionalities, respectively, from hardware to software and increases the functionality associated with the same (e.g., digital beam-forming, code division multiple access, etc.). In one embodiment, the CubeSats have total solar cell area exceeding 3,500 $cm^2$ and total antenna area exceeding 1,250 $cm^2$. In one embodiment, the CubeSats do not exceed 40 cm in length or 20 cm in width. In one embodiment, the CubeSats do not exceed 34 cm in length or 10 cm in width. In various embodiments, the CubeSats may weigh between 5 kg and 10 kg.

The ground transmitters, in various embodiments, receive and/or record data regarding a physical asset (e.g., agricultural field, tractor, train, car, ship, solar farm, cargo container, package, etc.) and wirelessly receive data from and transmit data (e.g., the previously received/recorded data) to the CubeSats. In one embodiment, the ground transmitters are of a small form and may be affixed to a physical asset to move with the physical asset as it moves. In various embodiments, the ground transmitters comprise one or more sensors and transmitters. The sensors generally comprise any device capable of gathering or generating data (e.g., temperature probe, hydrology probe, pressure sensor, position sensor, location sensor, computer, timer, Internet of Things-enabled device, smartphone, smartwatch, etc.). The transmitters are generally any device capable of transmitting data to and receiving data from the CubeSats.

Generally, much like the ground transmitters, the downlink receivers are any device that is capable of receiving and transmitting data to and from the CubeSats. In one embodiment, however, the downlink receivers are generally larger and more permanent (e.g., fixed antennas, etc.). Further, in various embodiments, the downlink receivers transmit data received from the CubeSats to and receive data from a central system. The central system generally receives and processes data regarding the disclosed system (e.g., distributing, manipulating, and performing data analytics on data from the ground transmitters, instructing the CubeSats to maintain certain orbits, instructing the CubeSats to contact or avoid contact with particular ground transmitters, instructing the ground transmitters to record certain data, updating software running on ground transmitters, etc.).

In one embodiment, a system, comprising: one or more ground transmitters, wherein each of the one or more ground transmitters corresponds to a particular physical asset; and one or more small form factor satellites deployed in low Earth orbit to transmit data to and receive data from the one or more ground transmitters and the one or more downlink receivers.

In one embodiment, a satellite, comprising: a generally rectangular cuboid-shaped body, comprising a nadir-pointing nose end hingedly coupled to at least two rectangular-shaped folding wings, wherein the at least two rectangular-shaped folding wings are proximate the body when not deployed and fold away from the body to a generally orthogonal position when deployed, and wherein each of the at least two rectangular-shaped folding wings comprise a first panel and a second panel connected together by a panel hinge.

According to one aspect of the present disclosure, the system, further comprising one or more downlink receivers. Furthermore, the system, wherein the one or more small form factor satellites further comprise CubeSats. Moreover, the system, wherein each of the one or more CubeSats comprise a phased array antenna to transmit the data to and receive the data from the one or more ground transmitters or the one or more downlink receivers. Further, the system, wherein each of the one or more CubeSats further comprise a software defined radio to process the data received from the one or more ground transmitters or the one or more downlink receivers. Additionally, the system, wherein the software defined radio, to process the data, uses digital beam-forming to increase gain of the phased array antenna without physically manipulating a position of the phased array antenna during receipt of the data from the one or more ground transmitters or the one or more downlink receivers. Also, the system, wherein the software defined radio, to process the data, uses code division multiple access or time division multiple access techniques to simultaneously transmit data to and receive data from at least two of the one or more ground transmitters or the one or more downlink receivers. Furthermore, the system, wherein each of the one or more CubeSats comprises: a generally rectangular cuboid-shaped body, comprising a nadir-pointing nose end hingedly coupled to at least two rectangular-shaped folding wings, wherein the at least two rectangular-shaped folding wings are proximate the body when not deployed and fold away from the body to a generally orthogonal position when deployed, and wherein each of the at least two rectangular-shaped folding wings comprise a first panel and a second panel connected together by a panel hinge.

According to one aspect of the present disclosure, the satellite, wherein the satellite further comprises a CubeSat. Moreover, the satellite, wherein the at least two rectangular-shaped folding wings comprise at least four rectangular-shaped folding wings. Further, the satellite, wherein each of the at least four rectangular-shaped folding wings comprise a length that extends away from the nadir-pointing nose end and a width that extends along the nadir-pointing nose end. Additionally, the satellite, wherein both the first panel and the second panel comprise the length, the width, a nadir-pointing side, and a zenith-pointing side. Also, the satellite, wherein the nadir-pointing side of both the first panel and the second panel comprises a phased array antenna to transmit and receive data and the zenith-pointing side of both the first panel and the second panel comprises solar panels. Furthermore, the satellite, wherein the phased array antenna exceeds a total surface area of 1,250 cm$^2$. Moreover, the satellite, wherein the solar panels exceed a total surface area of 3,500 cm$^2$. Further, the satellite, wherein the length does not exceed 40 cm and the width does not exceed 10 cm. Additionally, the satellite, wherein the satellite weighs no more than 10 kg. Also, the satellite, wherein the satellite is designed to operate in low Earth orbit.

According to one aspect of the present disclosure, the satellite, wherein the panel hinge connects the first panel and the second panel along the length of the first panel and the length of the second panel. Further, the satellite, wherein the panel hinge permits the first panel and the second panel to fold together so that the zenith-pointing side of the first panel is facing and substantially parallel to the zenith-pointing side of the second panel. Additionally, the satellite, wherein the panel hinge permits the first panel and the second panel to unfold so that the zenith-pointing side of the first panel is facing the same direction and in substantially the same plane as the zenith-pointing side of the second panel. Also, the satellite, wherein the wing hinge connects the first panel and the generally rectangular cuboid-shaped body along the width of the first panel and the width of the generally rectangular cuboid-shaped body. Furthermore, the satellite, wherein the wing hinge permits the at least four rectangular-shaped folding wings to fold so that the at least four rectangular-shaped folding wings are facing and substantially parallel to the generally rectangular cuboid-shaped body. Moreover, the satellite, wherein the wing hinge permits the at least four rectangular-shaped folding wings to unfold so that the at least four rectangular-shaped folding wings form substantially a right angle to the generally rectangular cuboid-shaped body and are in the same plane as the nadir-pointing nose piece.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary, high-level overview of one embodiment of the disclosed system.

FIG. 2 illustrates an exemplary architecture of one embodiment of the disclosed system.

FIG. 3 illustrates an exemplary low Earth orbit constellation, according to one embodiment of the present disclosure.

FIG. 4 (consisting of FIGS. 4A-4F) illustrates an exemplary CubeSat, according to one embodiment of the present disclosure.

FIG. 5 (consisting of FIGS. 5A-5B) illustrates exemplary test results showing the relationship between signal strength and the distance between a CubeSat and a ground transmitter, according to one embodiment of the present disclosure.

FIG. 6 (consisting of FIGS. 6A-6B) illustrates exemplary test results showing the relationship between signal power and signal frequency, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to small satellites and the use of small satellites, such as CubeSats and CubeSat-based systems, for ground-to-space short-burst data communications.

In various embodiments, the disclosed system comprises one or more small satellites (e.g., also referred to herein as "CubeSats" for ease of reference), one or more ground transmitters, and one or more downlink receivers to facilitate ground-to-space short-burst data communications. The disclosed system, in various embodiments, can be used in various Internet of Things applications or other areas in which traditional cell data or internet connections are not available. For example, the disclosed system permits the owner of multiple wind farms to monitor the status of the turbines enabled with ground transmitters in the farms without visiting the farms (e.g., determining efficiency to detect maintenance issues, sending commands to the turbines to protect them from damage, etc.). Similarly, the disclosed system permits remote monitoring of the conditions of fields on a farm (e.g., how much water a particular acre needs, received sunlight, etc.). Further, the disclosed system permits tracking shipments across oceans.

Generally, CubeSats are miniaturized or small-form satellites that orbit the Earth transmitting data to and from the ground transmitters and the downlink receivers in low Earth orbit. To efficiently use spacecraft surface area, in various embodiments, the CubeSats are designed with deployable and folding wings such that the zenith-pointing side of the wings comprises solar panels and the nadir-pointing side of the wings comprises an antenna. In various embodiments, to increase the data transmission capacity of the CubeSats, the CubeSats comprise a deployable phased array antenna and a software defined radio, which shifts traditional spacecraft pointing and data transmission functionalities, respectively, from hardware to software and increases the functionality associated with the same (e.g., digital beam-forming, code division multiple access, etc.). In one embodiment, the CubeSats have total solar cell area exceeding 3,500 $cm^2$ and total antenna area exceeding 1,250 $cm^2$. In one embodiment, the CubeSats do not exceed 40 cm in length or 20 cm in width. In one embodiment, the CubeSats do not exceed 34 cm in length or 10 cm in width. In various embodiments, the CubeSats may weigh between 5 kg and 10 kg.

The ground transmitters, in various embodiments, receive and/or record data regarding a physical asset (e.g., agricultural field, tractor, train, car, ship, solar farm, cargo container, package, etc.) and wirelessly receive data from and transmit data (e.g., the previously received/recorded data) to the CubeSats. In one embodiment, the ground transmitters are of a small form and may be affixed to a physical asset to move with the physical asset as it moves. In various embodiments, the ground transmitters comprise one or more sensors and transmitters. The sensors generally comprise any device capable of gathering or generating data (e.g., temperature probe, hydrology probe, pressure sensor, position sensor, location sensor, computer, timer, Internet of Things-enabled device, smartphone, smartwatch, etc.). The transmitters are generally any device capable of transmitting data to and receiving data from the CubeSats.

Generally, much like the ground transmitters, the downlink receivers are any device that is capable of receiving and transmitting data to and from the CubeSats. In one embodiment, however, the downlink receivers are generally larger and more permanent (e.g., fixed antennas, etc.). Further, in various embodiments, the downlink receivers transmit data received from the CubeSats to and receive data from a central system. The central system generally receives and processes data regarding the disclosed system (e.g., distributing, manipulating, and performing data analytics on data from the ground transmitters, instructing the CubeSats to maintain certain orbits, instructing the CubeSats to contact or avoid contact with particular ground transmitters, instructing the ground transmitters to record certain data, updating software running on ground transmitters, etc.).

Exemplary Embodiments

Referring now to the figures, for the purposes of example and explanation of the fundamental processes and components of the disclosed systems, reference is made to FIG. 1, which illustrates an exemplary, high-level overview 100 of one embodiment of the disclosed system. As will be understood and appreciated, the exemplary, high-level overview 100 shown in FIG. 1 represents merely one approach or embodiment of the present system, and other aspects are used according to various embodiments of the present system.

In various embodiments, the disclosed system comprises one or more small-form satellites (e.g., CubeSats) 102, one or more ground transmitters 104, and one or more downlink receivers 106 to facilitate ground-to-space short-burst data communications. Generally, CubeSats 102 are miniaturized satellites that comprise one or more cubic units, which are customized to facilitate ground-to-space short-burst data communications with the ground transmitters 104 and the downlink receivers 106. Similarly, the ground transmitters 104, in various embodiments, are devices capable of receiving and recording data regarding a particular physical asset and of transmitting data as part of ground-to-space communications with the CubeSats 102. In various embodiments, the downlink receivers 106 are devices capable of ground-to-space communications with the CubeSats 102 and of communication with a central system (not shown in FIG. 1)

to process the data received from the CubeSats 102. In various embodiments, the disclosed system can be used to monitor properties (e.g., operating parameters, health, required maintenance, etc.) regarding a particular physical asset (e.g., machine, physical location, vehicle, etc.), to communicate instructions to that physical asset via the ground transmitters 104, to track the location of physical assets in areas without sufficient cellphone reception or other terrestrial-based communications to do so, etc.

Generally, by way of example, and not by way of limitation, a high-level overview 100 of actions involved in ground-to-space short-burst data communications using the disclosed system is shown in FIG. 1 with the help of a sequence of numbered steps indicated as steps "1" through "5," which are annotated as circled numbers. As will be understood by one having ordinary skill in the art, the steps and processes disclosed herein may operate concurrently and continuously, are generally asynchronous and independent, and are not necessarily performed in the order shown. As shown in the overview 100, a communication generally commences, at step 1, wherein a ground transmitter 104 transmits data to a CubeSat 102 passing overhead. For example, a ground transmitter 104 associated with a train may pass data regarding the cargo of the train (e.g., current temperature, current mass, etc.), the train's current capacity (e.g., 90% full, 3 empty coal cars, no refrigerated space remaining, etc.), the train's health/maintenance data regarding the train (e.g., fuel efficiency, operating parameters of the brakes, etc.), or the train's location to the CubeSat 102. In various embodiments, this data may be received, recorded, and/or stored by the ground transmitter 104 prior to transmission. In one embodiment, the ground transmitter 104 may receive a signal from the CubeSat 102, prior to transmission of data, to initiate the transmission of data. Generally, this disclosure places no limitations on the types or amounts of data that may be transmitted between ground transmitters 104 and CubeSats 102. For example, the data may be in any format (e.g., binary, .pdf, .docx, .jpg, .raw, etc.), of any size (e.g., 1 MB, 1 GB, 10 GB, etc.), and in any number of files (e.g., 1 file, 10 files, 100 files, etc.). Similarly, this disclosure places no limitation on how data may be transmitted between ground transmitters 104 and CubeSats 102 (e.g., radio frequency transmissions, optical transmission, etc.).

At step 2, in various embodiments, the CubeSat 102 receives the data from the ground transmitter 104 and stores that data for subsequent transmission to another ground transmitter 104 or a downlink receiver 106. Generally, this disclosure places no limitations on the number of ground transmitters 104 that a particular CubeSat 102 may receive data from before subsequent transmission of a particular item of data or the amount of data that the CubeSat 102 may store before subsequent transmission of a particular item of data. Similarly, this disclosure places no limitations on the number of ground transmitters 104 (or in association with step 3, downlink receivers 106) from which the CubeSat 102 may receive data at one time (e.g., two ground transmitters 104, fifteen ground transmitters 104, etc.). Data processing techniques used to facilitate this receipt of data will be discussed in further detail in association with the description of FIG. 4.

In various embodiments, at step 3, the CubeSat 102 passes within range of a downlink receiver 106. Generally, the CubeSat 102 may send and receive many types of data when it is in range of a downlink receiver 106. For example, the CubeSat 102 may receive data from a downlink receiver 106 that needs to be transmitted to a particular ground transmitter 104 that the particular CubeSat 102 will encounter next (e.g., instructions on certain data to collect, certain data to transmit, etc.). In another example, the downlink receiver 106 may transmit the same data/instructions to every CubeSat 102 that passes within range of the downlink receiver 106 so that the next CubeSat 102 that encounters a particular ground transmitter 104 may pass the data/instructions to that ground transmitter 104 (e.g., if the location of the ground transmitter 104 is unknown because it is on a moving physical asset such as a train, car, ship, etc.). In one embodiment, the downlink receiver 106 may receive data from the CubeSat 102 (e.g., data received and saved previously from a ground transmitter 104). Generally, the downlink receiver 106 may then transmit that received data to another system (e.g., central system, central server, another downlink receiver 106, etc.) for processing or further action with regards to the data. In one embodiment, the transmission of data to another system need not occur using ground-to-space communications but may be instead made with terrestrial-based communications (e.g., internet, cellular communications, etc.). In one embodiment, the transmission of data to another system could occur using ground-to-space communications (further details of transmission to another system will be discussed in association with the description of FIG. 2). Generally, this disclosure places no limitations on the types or amounts of data that may be transmitted between downlink receivers 106 and CubeSats 102. For example, the data may be in any format (e.g., binary, .pdf, .docx, .jpg, .raw, etc.), of any size (e.g., 1 MB, 1 GB, 10 GB, etc.), and in any number of files (e.g., 1 file, 10 files, 100 files, etc.). Similarly, this disclosure places no limitation on how data may be transmitted between downlink receivers 106 and CubeSats 102 (e.g., radio frequency transmissions, optical transmission, etc.).

At step 4, as a particular CubeSat 102 passes within range of a particular ground transmitter 104, the CubeSat 102 may transmit data to that ground transmitter 104 (e.g., data previously received from another ground transmitter 104, a downlink receiver 106, etc.). In various embodiments, that data may be instructions for the ground transmitter 104 or the physical asset(s) associated with the same (e.g., record this type of data, move to this location, etc.) or it may be data that is needed by the ground transmitter 104 or the physical asset(s) associated with the same (e.g., data regarding the amount of potential cargo that a train can accept from a cargo ship, etc.).

In various embodiments, at step 5, the ground transmitter 104 receives the data from the CubeSat 102. In one embodiment, the ground transmitter 104 may then pass the received data along to the physical asset with which it is associated. For example, the ground transmitter 104 associated with a wind farm may receive data indicating that a storm is expected with winds exceeding the operational capacity of the turbines, so they need to be locked into place for protection. In another example, a ship may receive information that indicates some of its cargo will need to be routed to a different port as the train intended to carry that cargo is full or delayed. As will occur to one having ordinary skill in the art, although not shown in FIG. 1, at step 5, the ground transmitter 104 may also transmit data to the CubeSat 102 (e.g., steps 1 and 5 may occur at the same time).

Now referring to FIG. 2, an exemplary system architecture 200 is shown according to one embodiment of the present disclosure. In various embodiments, the system comprises a CubeSat 102, a ground transmitter 104, a downlink receiver 106, and a central system 202. In various embodiments, the disclosed system may operate automatically, based on machine learning, algorithms, preprogrammed instructions, etc., to perform the functionality disclosed herein. The disclosed system, in various embodiments, may operate based on human interaction(s) with the same (e.g., instructions to transmit data to a particular ground transmitter 104 or CubeSat 102, to record or process certain data, etc.). Generally, the exemplary system architecture 200 is shown for exemplary purposes only, as the disclosed system may comprise any number of CubeSats 102, ground transmitters 104, downlink receivers 106, or central systems 202.

Generally, the CubeSat 102 is any miniaturized or small-form satellite that is capable of performing the functionality disclosed herein. The CubeSat 102, generally, orbits the Earth transmitting data to and from the ground transmitters 104 and the downlink receivers 106 in low Earth orbit (further details of which will be discussed in association with the description of FIG. 3). In various embodiments, the CubeSat 102 comprises a deployable phased array antenna 204 and a software defined radio 206. The deployable phased array antenna 204, in one embodiment, is any collection of individual antenna elements that can be deployed from the CubeSat 102 to perform the functionality disclosed herein. In one embodiment, the software defined radio 206 is any device that shifts traditional data transmission functionalities from hardware to software and increases the functionality associated with the same (e.g., digital beam-forming, code division multiple access, etc.). Further details of the CubeSat 102 will be described in association with the description of FIG. 4.

The ground transmitter 104 is generally any device that is capable of performing the functionality disclosed herein. The ground transmitter 104, in various embodiments, receives and/or records data regarding a physical asset and receives data from and transmits data (e.g., the previously received/recorded data) to the CubeSat 102. In one embodiment, the ground transmitter 104 comprises a computing device (e.g., logic board, mini-pc, etc.), combination of computing devices, software, hardware, combination of software and hardware, database, or combination of databases that is capable of providing the functionality disclosed herein. In various embodiments, the ground transmitter 104 comprises a sensor 208 and a transmitter 210. The sensor 208 generally comprises any device capable of gathering or generating data (e.g., temperature probe, hydrology probe, pressure sensor, position sensor, location sensor, computer, timer, Internet of Things-enabled device, smartphone, smartwatch, etc.). In one embodiment, the sensor 208 further comprises storage to store recorded data from the sensor 208 prior to transmission to a CubeSat 102. In various embodiments, the ground transmitter 104 may comprise any combination of sensors 208, depending on the functionality of the ground transmitter 104. The transmitter 210 is any device capable of performing the functionality disclosed herein (e.g., transmitting data to and receiving data from the CubeSats 102). The ground transmitter 104 is generally associated with a particular physical asset (e.g., agricultural field, tractor, train, car, ship, solar farm, etc.) that will communicate using the disclosed system. In one embodiment, the ground transmitter 104 is of a generally small form and is attached to the particular physical asset so that it moves with the physical asset. This disclosure places no limitations on the types or functionalities of the sensors 208 and transmitters 210 that may comprise the ground transmitter 104.

Generally, the downlink receiver 106 is any device that is capable of performing the functionality disclosed herein. The downlink receiver 106, in various embodiments, receives and transmits data to and from the CubeSats 102. In one embodiment, the downlink receiver 106 is a large, permanent installation designed for ground-to-space communications with any satellites and not just CubeSats 102. In one embodiment, the downlink receiver 106 is a large, geostationary, communications satellite in orbit. Further, in various embodiments, the downlink receiver 106 transmits data received from the CubeSats 102 to and receives data from the central system 202. In one embodiment, the downlink receiver 106 comprises an operator 212 and a server 214. Generally, the operator 212 is any antenna, satellite dish, intermediate satellite, device, or combination of the same that is capable of receiving and transmitting ground-to-space communications. The server 214, in various embodiments, is any computing device, combination of computing devices, software, hardware, combination of software and hardware, database, or combination of databases that is capable of transmitting data to and receiving data from the central system 202.

The central system 202, generally, is any computing device, combination of computing devices, server, combination of servers, software, hardware, combination of software and hardware, database, or combination of databases that is capable of performing the functionality disclosed herein. In various embodiments, the central system 202 receives, processes, and distributes data regarding the disclosed system (e.g., manipulating data from the ground transmitters 104, instructing the CubeSats 102 to maintain certain orbits, instructing the CubeSats 102 to contact or avoid contact with particular ground transmitters 104, instructing the ground transmitters 104 to record certain data, etc.). The central system 202 may, in one embodiment, monitor the ground transmitters 104 and CubeSats 102 to detect malfunctions and provide corrections for the same (e.g., by transmitting instructions to the malfunctioning component). In one embodiment, the central system 202 may calculate which CubeSat 102 will next come into range of a particular ground transmitter 104. In one embodiment, the central system 202 is centrally controlled for all CubeSats 102 and ground transmitters 104, and the data received from ground transmitters is separated by which entity (e.g., company, individual, etc.) deployed the ground transmitters 104 and provided to that entity. In one embodiment, each entity has its own central system 202 that receives only the data pertaining to its deployed ground transmitters 104.

Referring now to FIG. 3, an exemplary low Earth orbit constellation 300 is shown according to one embodiment of the present disclosure. In various embodiments, the disclosed system is designed to function when deployed in low Earth orbit 302 (e.g., an altitude no more than 2,000 kilometers above the Earth's surface) because the CubeSats 102 generally do not have the power or surface area to operate properly in higher orbits. Generally, deploying the CubeSats 102 in low Earth Orbit 302 limits the amount of surface area of the Earth that the CubeSat 102 can cover at a given time (e.g., because it is lower to the surface, it cannot see as much of the Earth's surface at one time, as compared to if it were in a higher orbit). In one embodiment, the altitude of the orbit 302 is between approximately 500 km and 800 km. Generally, the inclination of the orbit 302 is between about 50° and 100°. In one embodiment, the inclination of the orbit 302 is between about 65° and 95°. In one embodiment, the constellation 300 comprises two to four orbit planes (e.g., different orbits 302). In one embodiment, the constellation 300 comprises up to thirty orbit planes. In one embodiment, each orbit plane comprises between two and four CubeSats 102, such that the constellation 300 comprises eight CubeSats 102 at a minimum. In one embodiment, the constellation 300 comprises up to one hundred fifty CubeSats 102. Generally, with four orbit planes and two CubeSats 102 per orbit plane in the constellation 300, any particular location on the Earth will come in range of a CubeSat 102 approximately every six hours (e.g., four times per day). As will occur to one having ordinary skill in the art, the more CubeSats 102 and the more orbit planes within the constellation 300, the less latency in coverage by the system. For example, with six orbit planes and two CubeSats 102 per orbit plane in the constellation 300, any particular location on the Earth will come in range of a CubeSat 102 approximately every four hours (e.g., six times per day).

Now referring to FIG. 4 (consisting of FIGS. 4A-4F), an exemplary CubeSat 102 is shown according to one embodiment of the present disclosure. The CubeSat 102 disclosed herein generally comprises three cubic units. In one embodiment, a particular CubeSat may comprise generic off-the-shelf components. In one embodiment, a particular CubeSat may comprise customized components, depending on its intended function. In various embodiments, the CubeSat 102 may comprise a chassis, deployable solar array, deployable patch antenna, propulsion system, battery, attitude determination system ("ADS"), attitude control system ("ACS"), process control unit, radio and antenna, flight computer and related components, location-determining radio and antenna (e.g., GPS, etc.), data recorder, data processor, radio, transceiver, etc. This disclosure places no limitations on the types of components of the CubeSat 102 or their functionalities, as the CubeSat's 102 construction may be generally modified to fit any purpose disclosed herein.

In one embodiment, the CubeSat 102 is generally in the shape of rectangular cuboid, with a nose piece 402 (also referred to herein as a "nose end"), wherein the nose piece 402 comprises one of the smaller ends of the CubeSat 102 and is nadir-pointing when deployed. In one embodiment, the nose piece 402 further comprises the main radio and transceiver. Generally, in various embodiments, attached to the nose piece 402 and extending along the length of each side of the CubeSat 102 are wings 404. In one embodiment, the wings 404 are generally rectangular shaped and of the same size and shape as the sides of the CubeSat 102 extending from the nose piece 402. The wings 404, in one embodiment, fold against the sides of the CubeSat 102 for storage/transportation to minimize the resources required to launch the CubeSat 102 into orbit and to maximize the capabilities of the CubeSat 102 once it is deployed. In one embodiment, the CubeSat 102 comprises four wings 404. In one embodiment, the CubeSat 102 comprises two wings 404. In one embodiment, the CubeSat 102 comprises one continuous wing 404 that folds into the CubeSat 102. This disclosure generally places no limitations on the number of wings 404 that the CubeSat 102 may comprise. In one embodiment, the wings 404 deploy (e.g., unfold) automatically (e.g., are spring loaded, use gravity to open, etc.). In one embodiment, the wings 404 deploy using hydraulics, motors, or other driven opening mechanisms. In one embodiment, the wings 404 once deployed cannot be returned to their original folded state. In one embodiment, the wings 404 can be returned to their original folded state to avoid damage, for reentry, maintenance, retirement, etc.

Generally, the wings 404 unfold to reveal their functional surfaces. For example, the wings 404 may be attached to the nose piece 402 by a hinge (e.g., also referred to herein as a "wing hinge") or any other structure that permits the wings 404 to fold directly outward from the body 406 of the CubeSat 102 (as shown in FIGS. 4B and 4C) until the wings 404 form substantially a right angle with the body 406 and are in the same place as the nose piece 402. In one embodiment, the wings 404 may further comprise two panels 408A and 408B connected by a hinge (e.g., also referred to herein as a "panel hinge") running substantially along the length of the wings 404 or any other structure to permit the panels 408A and 408B to fold together for storage and to unfold until the panels 408A and 408B are within the same plane for deployment (e.g., as shown in FIGS. 4D and 4E). Generally, this disclosure places no limitations on the number of panels 408A and 408B or panel hinges that may comprise the wings 404. In various embodiments, the nadir-pointing side of the deployed wings 404 comprises phased array antenna 410 and the zenith-pointing side of the deployed wings 404 comprises solar panels 412 (e.g., of any format capable of receiving and storing solar energy in low Earth orbit). Generally, use of both sides of the deployed wings 404 further increases the useful surface area of the CubeSat 102 and increases the functionality of the CubeSat 102 so that it can function as intended without excessive costs (e.g., because of the small form of CubeSats, the use of both sides of the deployed wings 404 permits generation of enough solar power to power the CubeSat 102 and provides enough antenna to facilitate ground-to-space short-burst data communications). In one embodiment, the nadir-pointing sides of the panels 408A and 408B fold together. In one embodiment, the wing hinge is attached only to panel 408A and not panel 408B.

Generally, the CubeSat 102 may weigh between 5 kg and 10 kg (e.g., approximately 7 kg to 8 kg at launch, approximately 8 kg to 9 kg at launch, etc.). In one embodiment, the CubeSat 102 has stowed/un-deployed dimensions of about 34×10×10 cm and deployed dimensions of about 34×78×78 cm, total solar cell area of about 4,080 cm$^2$ (with power production of about 23.2 W spread over approximately 12 panels) on the zenith-pointing side of the deployed wings 404, and total antenna area of about 2,720 cm$^2$ (with antenna gain of, for example, approximately 16 dBi and over 1,000 users per channel, spread over approximately 8 antenna panels) on the nadir-pointing side of the deployed wings 404. In one embodiment (not shown in FIG. 4), the CubeSat 102 has the same dimensions both deployed and undeployed (e.g., about 70×60×10 cm), total solar cell area of about 4,750 cm$^2$ (with power production of about 37.0 W), and total antenna area of about 4,150 cm$^2$ (with antenna gain of, for example, approximately 20 dBi and 32 users per channel). Generally, the CubeSat 102 has average power draw of about 11.6 W, peak power draw of about 33.5 W, energy storage of about 60.0 W-hr, propulsion capabilities of up to about 70 m/s, and a design life of approximately 2 years.

In one embodiment, the CubeSats have total solar cell area exceeding 3,500 cm$^2$ and total antenna area exceeding 1,250 cm$^2$. In one embodiment, the CubeSat 102 has total solar cell area exceeding 4,000 cm$^2$ and total antenna area exceeding 2,500 cm$^2$. In one embodiment, the body 406 of the CubeSat 102 does not exceed 40 cm in length or 20 cm in width. In one embodiment, the body 406 of the CubeSat 102 does not exceed 34 cm in length or 10 cm in width. In one embodiment, panels 408A and 408B are approximately 34×10 cm.

To avoid requiring the CubeSat 102 to constantly reposition itself for transmitting and receiving data (which takes time and energy and decreases the accuracy and timeliness of the transmissions) and to maximize the view of the CubeSat 102 given its low Earth orbit that generally reduces the amount of the Earth's surface that is within range of the CubeSat 102, in various embodiments, the phased array antenna 410 may be designed to use beam-forming to electronically steer the antenna for data transmission and reception. In one embodiment, the phased array antenna 410 may employ phase shifters and variable electrical line lengths to change the maximum gain of the received signal along a preferred line of sight, which creates different "look" angles without the need to slew or physically steer the antenna. Generally, the size of the different elements of the antenna 410 will depend on the intended communications frequency, with larger elements needed at UHF bands and smaller elements needed at S, X, and K bands. In one embodiment, the antenna 410 may comprise multiple smaller antennas that are individually controlled (e.g., a micro-strip patch antenna, etc.).

Further, in one embodiment, the antenna 410 may be combined with a software defined radio (e.g., software defined radio 206 from FIG. 2) to enhance the functionality and increased the flexibility of the antenna 410 by shifting functionality from the hardware to the software. Generally, the software defined radio may digitally process the signals simultaneously received from/transmitted by the antenna 410 using digital beam-forming, code division multiple access (e.g., "CDMA"), and other techniques. This disclosure places no limitations on the techniques that may be employed to improve the signal processing of the software defined radio and/or antenna 410. In various embodiments, digital beam-forming, during post processing of the raw signals, weights each antenna element in a phased array antenna and calculates the radiation patterns of the antenna to increase the gain reception of the antenna in different zones of interest while still covering a large area. In various embodiments, CDMA permits the antenna to receive multiple signals from multiple users (e.g., ground transmitters 104 and downlink receivers 106) at the same time. In one embodiment, CDMA encodes each signal with a unique code and uses those codes to demodulate the combined signals into the individual signals. In various embodiments, instead of CDMA, time-division multiple access or frequency-division multiple access may be used.

Referring now to FIG. 5 (consisting of FIGS. 5A-5B), exemplary test results revealing the relationship between radio frequency ("RF") signal strength received from two locations of a simple beam formed antenna and the distance between a CubeSat and a ground transmitter are shown according to one embodiment of the present disclosure. Generally, the data shown in FIG. 5 (and FIG. 6) was collected using a receiver and two locations of a simple beam formed antenna 204 mounted in an airplane to simulate a CubeSat 102 passing over, at varying altitudes, five different ground transmitters 104 positioned on the ground. Generally, the data in FIGS. 5A-5B represents data collected at different altitudes. As shown in FIG. 5, in various embodiments, the overall signal strength increases as the CubeSat 102 gets closer to each ground transmitter 104 and decreases as the CubeSat 102 gets farther away from the ground transmitter 104. In addition, the lateral shift in signal strength received by the simulated forward (leading) antenna relative to the simulated back (trailing) antenna generally highlights the ability to focus the antenna pattern toward a particular transmitter 104 of interest using digital beam-forming techniques. In addition, the signal strength profiles of the two transmitters 104 in FIG. 5A generally represent various modulation techniques that were tested, highlighting the ability for beam-forming techniques to work with multiple encoding options. In various embodiments, digital signal processing and the software defined radio in the receiver can accomplish this focusing effect simultaneously by post-processing received signal data from each antenna element.

Now referring to FIG. 6 (consisting of FIGS. 6A-6B), exemplary ground test results revealing the relationship between RF signal power received and signal frequency are shown according to one embodiment of the present disclosure. As shown, FIG. 6A relates to the relationship between signal power received in the nominal signal frequency band of about 434 MHz with about 100 kHz bandwidth, as notionally received by the CubeSat 102, when the ground transmitter 104 is turned on. In contrast, FIG. 6B relates to the relationship between signal power received and signal frequency, as notionally received by the CubeSat 102, when the ground transmitter 104 is turned off. In the simple ground demonstration, in one embodiment, a received power difference of approximately 25 dB was observed in this frequency. Generally, as will occur to one having ordinary skill in the art, the results in FIG. 6 represent the noise that a CubeSat 102 will encounter and need to compensate for when receiving simultaneous ground signals using the software defined radio 206. In addition, when the distance between the transmitter 104 and CubeSat 102 is increased to that of an orbiting satellite, the receiver antenna gain generally will be significantly increased to clearly record the incoming data. The specific RF frequency tested in this example is not meant to be limiting to the present disclosure.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing the steps disclosed herein. The particular sequence of such executable instructions or associated data structures represent examples of corresponding acts for implementing the functions described in such steps.

Those skilled in the art will also appreciate that the claimed and/or described systems may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A satellite, comprising:
   a generally cuboid-shaped body, comprising a nadir-pointing nose end hingedly coupled to at least two folding wings,
      wherein the at least two folding wings are proximate the body when not deployed and fold away from the body when deployed.

2. The satellite of claim 1, wherein the cuboid-shaped body is substantially rectangular.

3. The satellite of claim 1, wherein the at least two folding wings are substantially rectangular.

4. The satellite of claim 1, wherein the at least two folding wings comprise a first panel and a second panel connected together by a panel hinge.

5. The satellite of claim 4, wherein the panel hinge connects the first panel and the second panel along a length of the first panel and a length of the second panel.

6. The satellite of claim 4, wherein a nadir-pointing side of at least one of the first panel or the second panel comprise a phased array antenna to transmit and receive data and a zenith-pointing side of at least one of the first panel or the second panel comprise solar panels.

7. The satellite of claim 1, wherein the at least two folding wings fold away from the body to a generally orthogonal position when deployed.

8. The satellite of claim 1, wherein the satellite is operable to be deployed in low Earth orbit.

9. A system comprising:
one or more ground transmitters;
one or more satellites to transmit data to and receive data from the one or more ground transmitters; and
wherein each of the satellites comprises:
a generally cuboid-shaped body, comprising a nadir-pointing nose end hingedly coupled to at least two folding wings,
wherein the at least two folding wings are proximate the body when not deployed and fold away from the body when deployed.

10. The system of claim 9, further comprising one or more downlink receivers.

11. The system of claim 9, wherein each of the one or more ground transmitters corresponds to a particular physical asset.

12. The system of claim 9, wherein the one or more satellites are each of a small form factor.

13. The system of claim 9, wherein the one or more satellites are deployed in low Earth orbit.

14. The system of claim 9, wherein the one or more satellites further comprise a phased array antenna to transmit the data to and receive the data from the one or more ground transmitters.

15. The system of claim 9, wherein the one or more satellites further comprise a radio with software-based configuration capabilities to process the data received from the one or more ground transmitters.

16. The system of claim 9, wherein the cuboid-shaped body of each of the satellites is substantially rectangular.

* * * * *